(12) United States Patent
Prindle

(10) Patent No.: US 8,983,864 B2
(45) Date of Patent: Mar. 17, 2015

(54) LINKING ONLINE AND RETAIL-LOCATION SHOPPING CARTS

(71) Applicant: Blueport Commerce, Boston, MA (US)

(72) Inventor: Carl Prindle, Boston, MA (US)

(73) Assignee: Blueport Commerce, Boston, MA (US)

( * ) Notice: Subject to any disclaimer, the term of this patent is extended or adjusted under 35 U.S.C. 154(b) by 0 days.

(21) Appl. No.: 14/281,312

(22) Filed: May 19, 2014

(65) Prior Publication Data
US 2014/0344109 A1    Nov. 20, 2014

Related U.S. Application Data

(60) Provisional application No. 61/824,697, filed on May 17, 2013.

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0619* (2013.01); *G06Q 30/0617* (2013.01)
USPC ...................... 705/26.8; 705/26.43; 705/26.44

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | | |
|---|---|---|---|
| 2003/0163358 A1* | 8/2003 | Omori ............................... | 705/8 |
| 2007/0235527 A1* | 10/2007 | Appleyard et al. ........... | 235/383 |
| 2008/0040240 A1* | 2/2008 | Covington et al. ............. | 705/27 |

OTHER PUBLICATIONS

Bunish, C., MacArthur, K., & Neff, J. (2000). Building on tradition. Advertising Age, 71(16), 72-82.*

* cited by examiner

*Primary Examiner* — Resha Desai
(74) *Attorney, Agent, or Firm* — Mintz Levin Cohn Ferris Glovsky and Popeo, P.C.

(57) ABSTRACT

A system for linking a shopper's online electronic shopping cart with the shopper's in-store electronic shopping cart is provided. The system includes an online website of a merchant for the purchase of goods by one or more shoppers. Each shopper is provided with an online electronic shopping cart accessible through the website and an in-store electronic shopping cart accessible at a local retail location. The online and in-store electronic shopping carts are linked by placing one or more items contained in the online shopping cart in the in-store shopping cart and vice versa. Related apparatus, methods, techniques and articles are also described.

21 Claims, 13 Drawing Sheets ated, including customer information, information about their interested item(s) and prices and promotions, and store salesperson information, and other information that may have
LINKING ONLINE AND RETAIL-LOCATION SHOPPING CARTS

CROSS-REFERENCE TO RELATED APPLICATION

This application claims the benefit of U.S. Provisional Application No. 61/824,697, filed on May 17, 2013, the contents of which are incorporated herein by reference in their entireties.

FIELD

This disclosure relates to linking shopping carts such as online virtual shopping carts of a business entity, and a retail-location shopping cart (virtual or otherwise).

BACKGROUND

Shoppers generally like shopping in local stores where they can physically interact with the merchandise, get advice and receive purchases immediately. Shoppers also generally like the convenience of shopping online where they can easily research and browse a wide array of merchandise. However, many retailers operate either strictly online without physical stores (e.g., they take orders online and ship from warehouses), and thus do not provide their customers the opportunity to interact in person with the merchandise or sales personnel or take their merchandise home immediately. On the other hand, many traditional retailers rely mainly on local ("brick and mortar") stores, and do not have (or have minimal) online presence. To better serve customers, traditional retailers have been increasing their online presence, while online retailers have been opening up local retail stores or showrooms.

Although many stores now operate both online and local stores, they often operate as separate entities, and provide disjointed shopping experiences. For example, if a shopper visits a local store, the retailer would have no record of the visit (e.g., date, time, customer data, items browsed, etc.). Once the customer leaves the store, the retailer's connection with that customer is lost. Consequently, when that shopper later visits the retailer's online store, the shopper would need to search for the item(s) that interested them again. Conversely, while many online retailers capture a lot of information on each customer's data and activities (e.g., through the use of browser cookies), this information is generally not available to the local stores. Thus, when a customer later visits the local store, the customer would need to look for the interested item(s) again, and the salespersons at the local store would not have access to information such as the customer's interested item(s), browsing history, whether that have been approved for financing, what marketing they have seen, etc.

Some online retailers enable customers to save the interested item(s) in, for example, a "wish list." But this is typically nothing more than just a list of saved items that serves as a reminder to the shopper. This information is not generally available to the store to assist shoppers and, as discussed above, retailers are currently unable keep track of, for example, whether or when a customer actually visited the local store, and which items they were interested in at the local store. Without data collection in and consistency between online and in-store shopping, retailers are prevented from providing a seamless shopping experience to customers and miss out on valuable data that can be used to, for example, enhance and increase marketing, target and deliver promotions, and assist and provide incentives for sales persons to facilitate sales.

Accordingly, there is a need for a system that integrates more fully the online and in-person retail stores, and provides a more seamless shopping experience.

SUMMARY

The present disclosure provides systems and methods for a merchant to engage a customer in an enhanced shopping experience, including, for example, linking online and in-store virtual shopping carts. Such variations enable increased customer service and easier purchase and organization of products and services desired by customers and continuity of data desired by retailers for optimization of merchandising, marketing and sales processes.

In some variations, the merchant has an online website, mobile application or other means of digital commerce (simplified herein as a "website") for the purchase of goods and/or services (together referred to as "goods"), as well as one or more local brick-and-mortar retail locations. A shopper can establish an online presence at the online website of the merchant ("Retailer Website"). The Retailer Website typically affords the shopper the opportunity to browse and purchase merchant goods online. Such goods can be selected and placed in the shopper's online virtual cart ("OL V-cart") on the website. Thereafter, the shopper can, during a checkout process, have the goods delivered to a specific location (e.g., home, work), or, can arrange to have the goods picked up at a retail location of the merchant. Alternatively, should the shopper not want to complete their purchase online, the shopper can choose to send their OL V-cart to the merchant's local store. Such OL V-cart is transmitted, including customer information, information about their interested item(s) and prices and promotions, to the local store's Point of Sale system, establishing an in-store, retail-location virtual shopping cart ("IS V-cart"). The shopper will receive a confirmation that their OL V-cart is available in their local store. Such confirmation may include one or more of: an email, printable confirmation screen, QR code, Bar code, or other identifying data or mark. Upon arriving at the local store, the shopper can provide one or more of: name, an identifier (generally a phone or email address) an electronic signal from their mobile device (e.g., NFC/mobile identifier(s)) or the confirmation they received to a sales person who can access the related IS V-cart via a mobile phone, tablet, a kiosk, in-store PC, Point of Sale System and the like. The salesperson can access the customer information and efficiently guide the shopper to the merchandise they are interested in, answer questions they may have, and complete the shopper's purchase without requiring additional information, as such purchase information already resides in the local store's Point of Sale system in the context of the customers IS V-cart.

In some variations, when shopping at the merchant's retail location, the shopper may chose not to purchase during that store visit, perhaps wishing to further consider their purchase. At the retail location, the shopper or a salesperson assisting the shopper may create an in-store, retail-location virtual shopping cart ("IS V-cart") via a mobile phone, tablet, a kiosk, in-store PC, Point of Sale System and the like. The IS V-cart may have information identifying a store salesperson that helped the customer in the merchant's retail location. Upon creation of the IS V-cart, a corresponding OL V-cart is created, including customer information, information about their interested item(s) and prices and promotions, and store salesperson information, and other information that may have been collected by the salesperson. The shopper may receive notification that a corresponding OL V-cart is available and that their purchase can be completed by accessing the Retailer Website without returning to the store or reentering their information, such information already residing in the website's system in the context of their OL V-cart.

In some variations, the IS V-cart can be linked to the customer's OL V-cart. Such linking, in some variations, may be only need to be done once, and thus, the two carts can be linked indefinitely, or until the customer unlinks the carts. Any change made by the shopper online to the OL-V-cart is available in the IS V-cart should the shopper chose to complete the purchase in a local store. Any changes to the IS V-cart are similarly available in the OL V-cart should the shopper wish to purchase online. Such changes might include customer information, price changes, product availability, alternative merchandise, special promotions and the like made in store or online by the shopper or salesperson.

In some variations, the ability of a salesperson in a local store to create an IS V-cart and associate themselves with such IS V-cart can be used by merchants to incentivize desired salesperson behaviors through paying a commission on IS V-carts that result in OL v-carts later purchased outside the store.

In some variations, OL and IS V-carts can be presented to Salespeople as leads, including customer information and interested item(s) to enable Salespeople to engage customers personally through mediums such as email, phone, traditional mail, text and the like.

In some variations, the data collected as shoppers move between online and local stores creating OL and IS V-carts can be used for business intelligence purposes, to understand and motivate consumer behaviors through merchandising adjustments, automated marketing programs, personalization, and other digital and in-store conversion techniques.

In some variations, a computer implemented method is provided and may comprise one or more of the following steps, in some variations, two or more steps, an in still other variations, all of the steps: providing an online website of a merchant for the purchase of goods by one or more shoppers, storing shopper information on a shopper database, wherein each shopper is associated with an particular account, associating a first electronic (e.g., virtual) online shopping cart with each account, wherein items selected for purchase by each respective shopper is placed in the first cart, associating a second electronic in-store shopping cart with each account, the in-store cart corresponding to at least one in-store, retail location of the merchant, wherein items selected for purchase by each respective shopper at the in-store, retail location is placed in the second cart, and linking the first cart with the second cart, wherein as a result of such linking, items contained in the first cart are automatically placed or updated in the second cart, and/or items contained in the second cart are automatically placed or updated in the first cart.

In some variations, a system for linking a shopper's online virtual shopping cart with the shopper's in-store, retail location virtual shopping cart is provided and includes providing at least one server, the server having computer instructions operating thereon to perform a method of linking electronic shopping carts. Such a method may be in accordance with any method disclosed herein.

The present subject matter provides a computer-implemented method comprising providing an online website of a merchant for the purchase of goods by one or more shoppers; storing shopper information in a shopper database, wherein each shopper is associated with a particular account; associating an online electronic shopping cart with each account, wherein one or more items selected for purchase by each respective shopper is placed in the online shopping cart; associating an in-store electronic shopping cart with each account, the in-store shopping cart corresponding to at least one retail location of the merchant, wherein the one or more items selected for purchase by the respective shopper at the retail location is placed in the in-store shopping cart; and linking the online shopping cart with the in-store shopping cart. The linking can include placing items contained in the online shopping cart in the in-store shopping cart, and/or placing items contained in the in-store shopping cart in the online cart; and updating the shopper information in the shopper database with one or more new data gathered from the online shopping cart and/or the in-store shopping cart.

In some variations, the method can further include one or more of: associating an identification of an in-store sales person with the online and in-store shopping carts; associating sales information attributed to the in-store sales person with the online and in-store shopping carts; generating a confirmation associated with a first shopper's online shopping cart; and synchronizing the online and in-store shopping carts with one another when a change has been made in either cart.

In some variations, the confirmation comprises the shopper information associated with the first shopper's account. In some variations, the confirmation enables the first shopper to access the first shopper's online and/or in-store shopping cart.

The present subject matter also provides a system for linking a shopper's online electronic shopping cart with the shopper's in-store electronic shopping cart. The system can include providing at least one server, the server having computer instructions operating thereon to perform a method of linking virtual shopping carts. The method can include providing an online website of a merchant for the purchase of goods by one or more shoppers; storing shopper information in a shopper database, wherein each shopper is associated with a particular account; associating an online electronic shopping cart with each account, wherein one or more items selected for purchase by each respective shopper is placed in the online shopping cart; associating an in-store electronic shopping cart with each account, the in-store shopping cart corresponding to at least one retail location of the merchant, wherein the one or more items selected for purchase by the respective shopper at the retail location is placed in the in-store shopping cart; and linking the on-line shopping cart with the in-store shopping cart including placing items contained in the online shopping cart in the in-store shopping cart, and/or placing items contained in the in-store shopping cart in the online cart; and updating the shopper information in the shopper database with one or more new data gathered from the online shopping cart and/or the in-store shopping cart.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
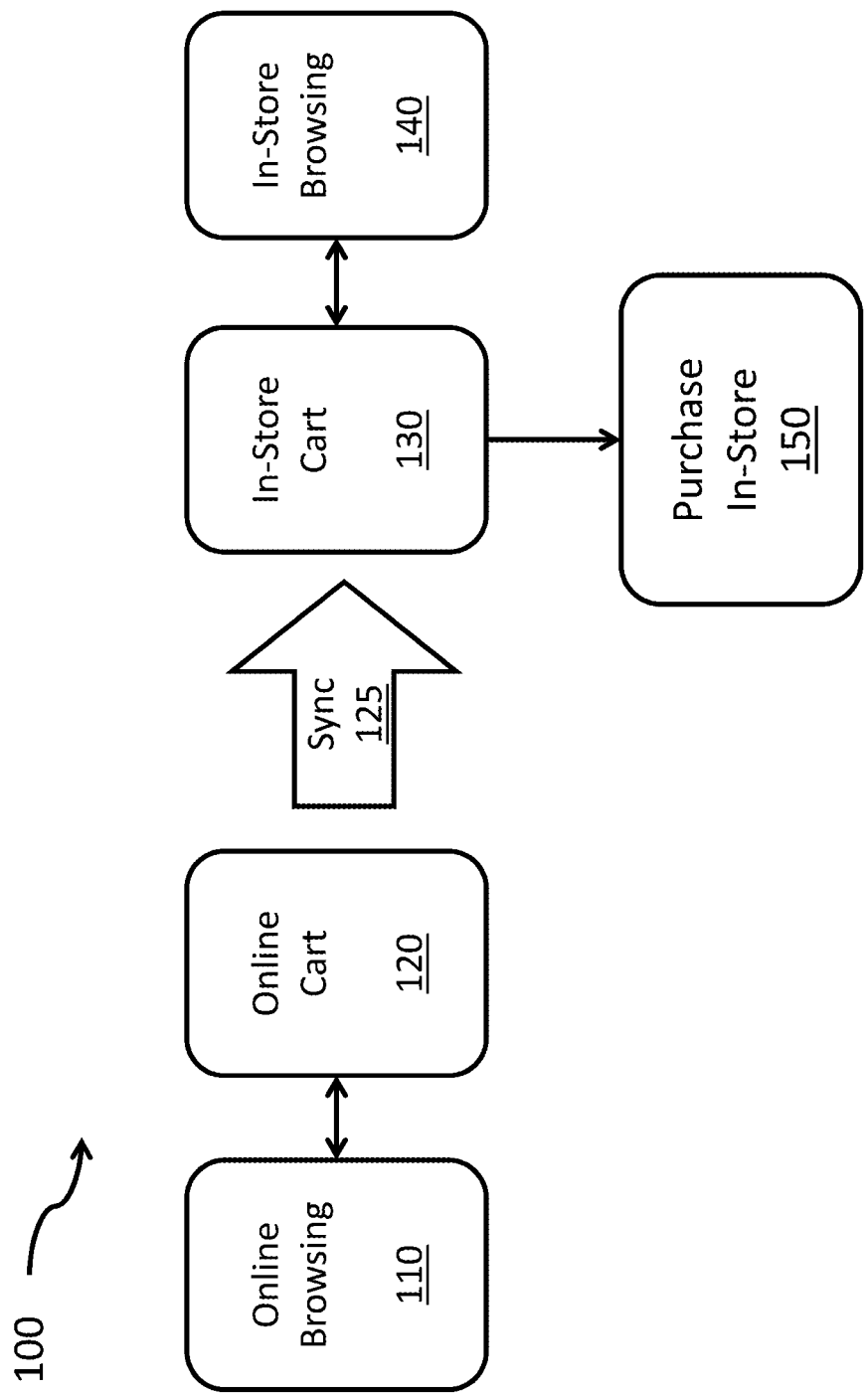
FIG. 1 is a process flow diagram illustrating an example of an implementation of the present subject matter.

FIG. 1 illustrates an example of an overall process flow of a shopping experience provided by the present subject matter that begins online and completes in-store. In this example, the present subject matter provides a retailer website on which a shopper can browse at 110, and place one or more items in an on-line shopping cart (OL V-cart) at 120. The website can be accessed using, for example, a computer, tablet, smartphone, smart TV, or any suitable device. Before completing the purchase, the shopper wishes to visit a local store, for example, to speak with a salesperson, to see and touch the one or more items, and/or to purchase the items in store for immediate possession. To provide a seamless online and in-store shopping experience, the present subject matter creates an in-store shopping cart (IS V-cart) and synchronizes it with the shopping's OL V-cart at 125. In some variations, the OL V-cart and the IS V-cart can include one or more information such as shopper information, interested items, pricing, promotions, financing approvals, coupons, browsing history (e.g., online, in-store, or both) and other sales/marketing information. This information can be synchronized between the OL and IS V-carts and/or updated in a shopper database containing shopper information. In some variations, the synchronization can take place, for example, anytime a new change is made, or an action is taken by the shopper, or periodically.

When the shopper visits the store, at 130, the shopper can access the IS V-cart using, for example, a point-of-sale (POS) system including, for example, a computer, tablet, smartphone, or any suitable means. At 140, the shopper can browse in-store, see the interested items in person, gather additional information and add/remove one or more items in the IS V-cart. In some variations, this can be done by entering the item information into the POS system, scanning a barcode, proximity based technology (such as near-field communication (NFC)), or other suitable means. In some variations, a salesperson can assist the shopper at the store and add the salesperson's identifying information to the IS V-cart. For example, the salesperson may be provided with a POS device and can access the shopper's IS V-cart. By providing access to the shopper's IS V-cart, the salesperson can, for example, direct the shopper to the item(s) in the IS V-cart, review the shopper's information (including, for example, browsing history and/or other data) and make sales recommendations/suggestions, enter the shopper's in-store browsing history and sales data such as notes and comments from the salesperson or the shopper during the in-store shopping experience. This enables the present subject matter, for example, to track the shopper's in-store browsing history and/or other sale information. In some variations, this information can be used to determine commissions for the salesperson who assisted with the sale. At 150, the shopper can complete the purchase at the store using, for example, the point-of-sale system. In some variations, the shopper can pick up the item(s) at the store, or have the item(s) shipped to an address (or pick up some of the items at the store and have the other items shipped). After the purchase, the present subject matter can determine one or more commissions earned by one or more parties who helped achieve the sale including, for example, one or more salespersons and other websites (e.g., ad clicks).

Figure 2:
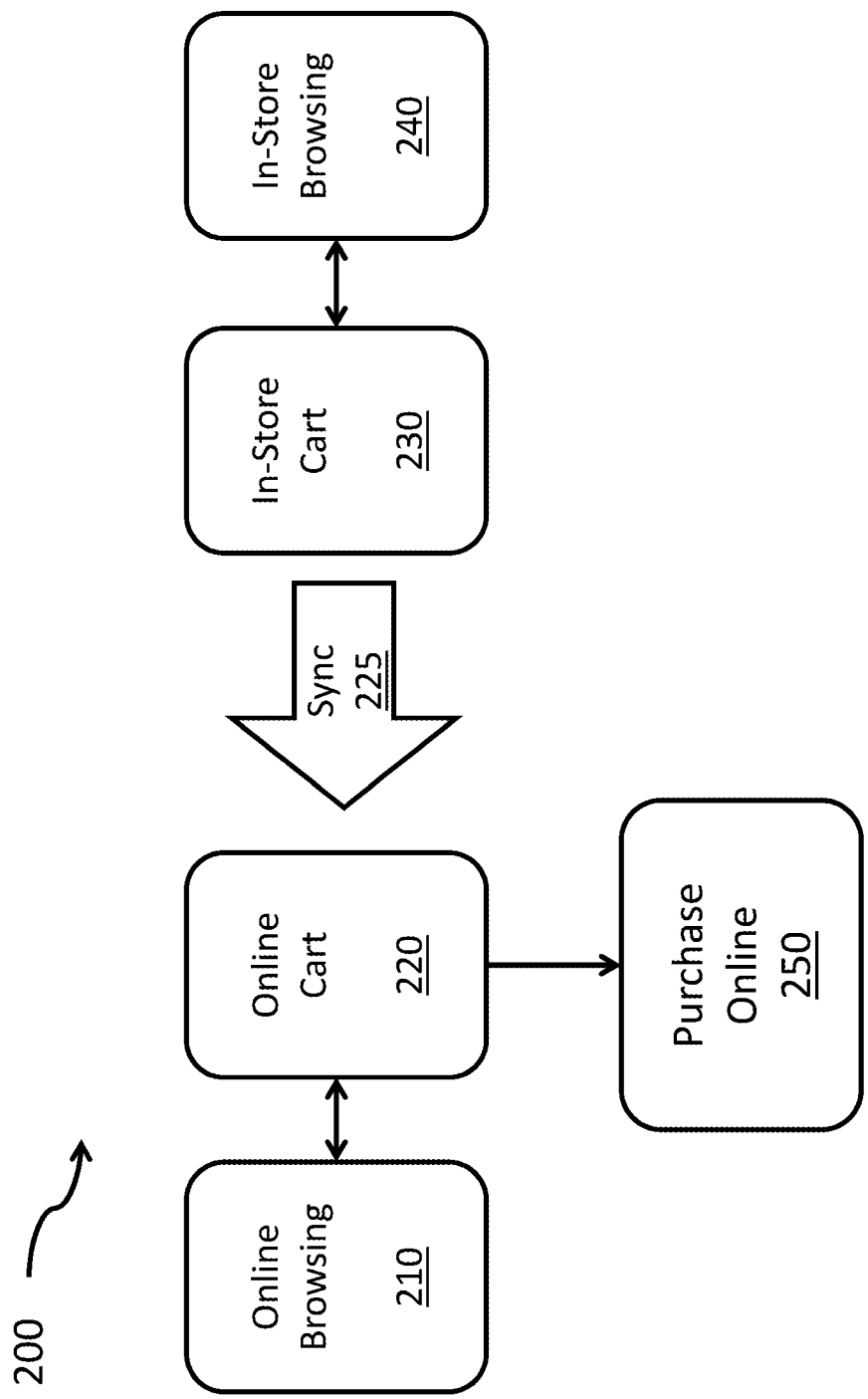
FIG. 2 is a process flow diagram.

FIG. 2 illustrates an example of an overall process flow of a shopping experience provided by the present subject matter. This example is similar to that shown in FIG. 1 except that the shopper begins the shopping experience at retailer's store and completes it online. At 240, the shopper browses the merchandise in-store, and adds/removes one or more items to the shopper's IS V-cart. In this case, the shopper wishes to complete the purchase online (for example, the shopper needs more time to decide, or discuss with a family member before purchase). To provide a seamless online and in-store shopping experience, the present subject matter syncs the shopper's IS V-cart with the shopper's OL V-cart at 225. In some variations, the OL V-cart and the IS V-cart can include one or more shopper information including, for example, one or more of: interested items, financing approvals, coupons, browsing history (e.g., online, in-store, or both), product availability, pricing promotions, marketing seen, attitudinal segmentation, number of visits, recency of visits, advertising seen, and other sales/marketing information.

The shopper can access the IS V-cart via the retailer's website at 220, and can also browse for additional items at 210, and add/remove one or more items from the online cart. At 250, the shopper can complete the purchase online. In some variations, the shopper can select to have the item(s) shipped to an address and/or picked up in-store. After the purchase, the present subject matter can determine one or more commissions earned by one or more parties who helped achieve the sale including, for example, one or more salespersons and other websites (e.g., ad clicks).

Figure 3:
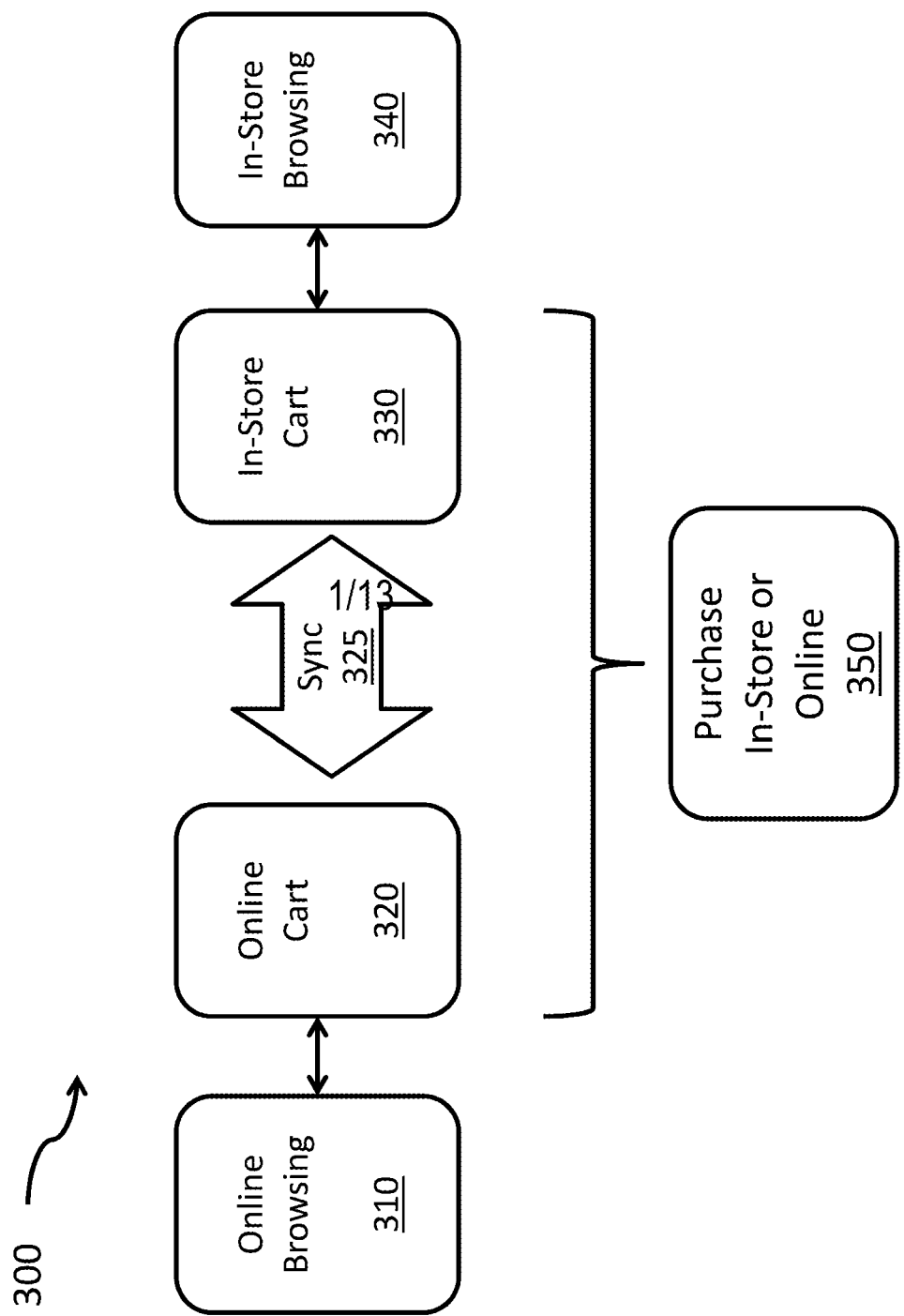
FIG. 3 is a process flow diagram.

FIG. 3 illustrates yet another example in accordance with the present subject matter. This example shows a flexible system in which the shopper can begins the shopping experience online or in-store. The shopping experience can include one or more online and/or in-store shopping sessions, for example, as described above with respect to FIGS. 1 and 2, and can complete the purchase either online or in-store. As the shopper moves between each online and in-store shopping session, the present subject matter syncs the OL V-cart with the IS V-cart (or vice versa) to update, for example, the items, and one or more associated data including, for example, those discussed herein. After the purchase, the present subject matter can determine one or more commissions earned by one or more parties who helped achieve the sale including, for example, one or more salespersons and other websites (e.g., ad clicks).

In some variations, the present subject matter can generate automated marketing based on a shopper's online and/or in-store browsing history. In some variations, additional information gathered by the present subject matter can also be used. The automated marketing may be provided, for example, in one or more ads on the website during the shopping session (e.g., while browsing and/or accessing the shopping cart). In some variations, one or more e-mails containing one or more ads can also be generated and sent to the shopper.

In some variations, the present subject matter enables personalization of the website and/or the in-store shopping experience. For example, information provided from the store cart about interested item(s), pricing, promotions or information about the behavior of the shopper in store added by the system or sales person (e.g., "the shopper is interested in product features", the "the shopper is interested in price" or "the shopper received financing") may be used to personalize merchandise presentation or marketing materials on the website, emails or online advertising. Conversely, information gathered online (e.g., "the shopper browsed these products", "the shopper visited a Sale page", "The shopper applied for and received financing", or "the shopper clicks more style related images than deal related images" can be used to personalize the in-store experience, by providing this information to a salesperson who can then tailor their communication with the shopper accordingly.

In some variations, the present subject matter can create a relationship between the OL V-cart and the IS V-cart by submitting, for example, a shopper identifier, which may be, for example, the shopper's email address, phone number (mobile or otherwise), or any other unique identifier. In some variations, the OL V-cart and the IS V-cart can be synched automatically without further shopper input. Once linked, items in one cart can be pushed/pulled (synchronized) to the other cart and updated thereafter. According to some variations, if no items are found in either cart, the carts remain empty until the shopper selects items to place therein. It should be noted that one or more of the features described herein can be performed online or in-store. This provides a seamless shopping experience between online and in-person stores. For example, the relationship between the OL V-cart and the IS V-cart can be created/performed at the store or online.

In some variations, the present subject matter can allow the shopper to instruct the system to sync his/her online and in-store V-carts. For example, a "Store Sync (or other branded term for the subject matter such as "Easy Pass)" tab can be provided on the website and/or the POS system in store to link his/her online and in-store V-carts. In some variations, this can be, for example, a button in a website header, a tab click area within the V-cart, a page element link and/or an email link. In some variations, the shopper may be prompted to link an OL V-cart to an IS V-cart through a prompt such as "Complete your purchase in store". In some variations, the shopper may be prompted to link an IS V-cart to an OL V-cart through a prompt such as "Retrieve your Store Cart (or some other terminology for the IS-VCart such as "Quote" or "List". If the carts are already linked, the two carts are kept linked, at which point the shopper can purchase the IS V-cart online or proceed to a store to complete an IS-VCart purchase in store. If the carts are not yet linked, the shopper may then submit his/her email and/or phone to "link" the carts. The carts may also be unlinked by the shopper.

In some variations, the present subject matter can determine whether an IS V-cart exists for a shopper when the shopper provides his/her information to the merchant's website. If one is found, an inquiry can be made to determine whether items are contained in the shopper's OL V-cart. If so, an IS V-cart is created and items from the OL V-cart are pushed to the IS V-cart. Thereafter, notification can be generated and displayed to the shopper that the OL V-cart and IS V-cart are now synched, and additional information may be provided to the customer including, for example, notification that no other in-store cart was found and that one has been created, or indicating that changes made to the OL V-cart will also update the IS V-cart.

If there are no items in the OL V-cart, a message can be displayed to the customer indicating as such.

If an IS V-cart is found, the present subject matter can determine if items are contained in the OL V-cart and visa-versa. Items may then be pushed/pulled from one V-cart to another such that each V-cart has the same items, i.e., the V-carts are synced. Thereafter, the customer may then buy the items that were contained in the IS V-cart online, and visa-versa.

If an IS V-cart is found, and there are no items in the OL V-cart, the items contained in the IS V-cart can be pulled from the IS V-cart into the OL V-cart.

IF an IS V-cart is found and there are items in the OL V-cart, the items contained in the IS V-cart can be pulled from the IS V-cart and added to (i.e. merged with) the items already in the IS V-cart.

In some variations, the customer can be notified that changes made to their OL V-cart will also be reflected in their IS V-cart. Thereafter, the customer can return to the "Buy Now" tab which will show a consolidated list of items from the V-carts.

Figure 4:
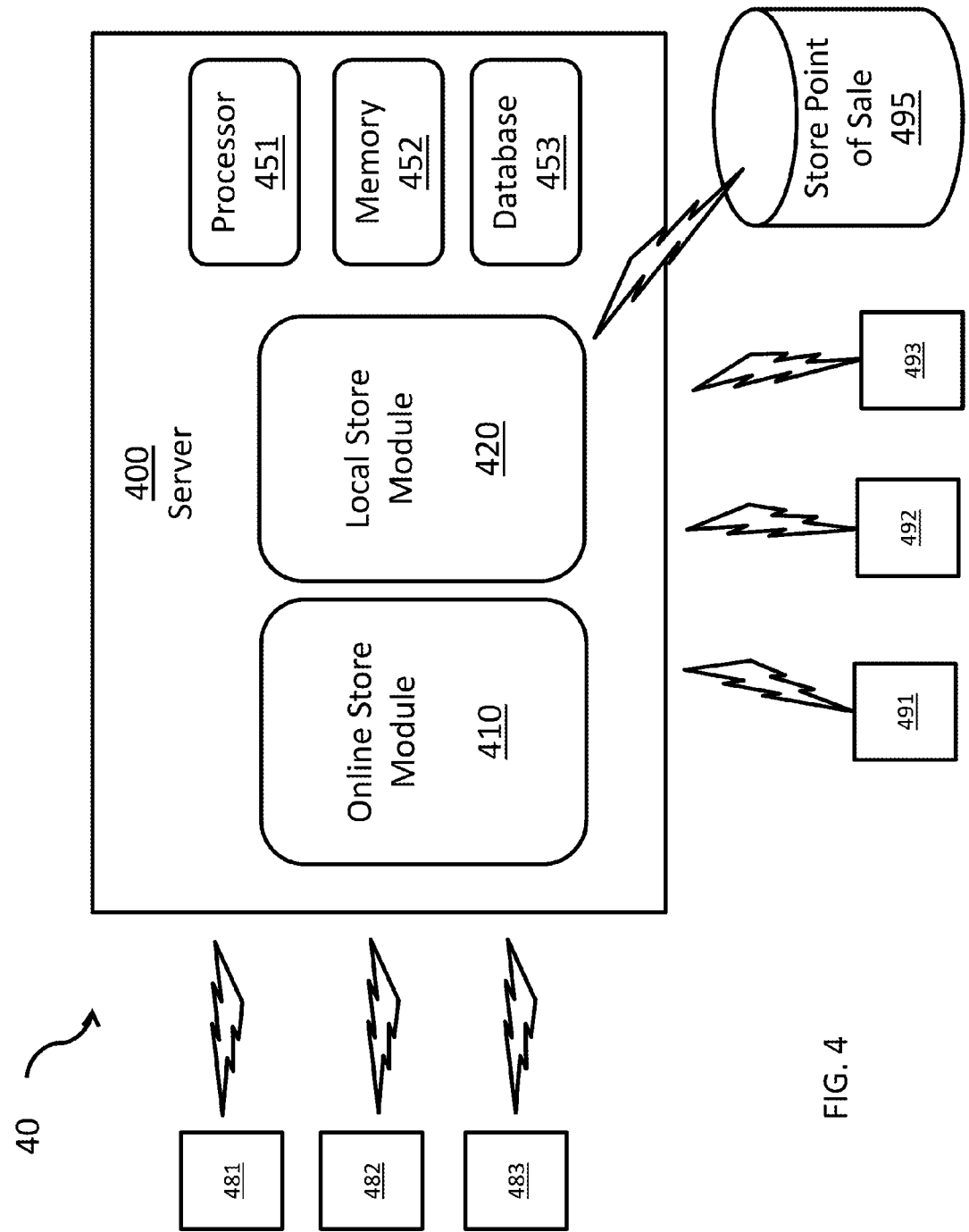
FIG. 4 is a schematic diagram illustrating a computer-implemented system in accordance with the present subject matter.

FIG. 4 is an illustration of a computer-implemented system in accordance with the present subject matter. System 40 includes a server 400, which includes one or more computer processors 451, one or more memories 452, and one or more databases 453. Server 400 is in data communication with a plurality of customer devices 481-483, 491-493 (the number of these devices is not important, as the system can be configured to communicate with any number of devices), and a Store Point of Sale System 495. Here, devices 481-483 are connected to and accessing the website (and the OL V-cart) via an Online Store Module 410 of Server 400 by users who are not in-store, and devices 491-493 are at a local store, and are connected and accessing the IS V-cart via the Local Store Module 420 of Server 400. These devices can be, for example, PCs, tablets, smartphones, or any suitable device.

Here, Online Store Module 410 is configured to implement one or more features related to the Merchant's website, including, for example, the OL V-cart. Local Store Module 420 is configured to implement one or more features related to the in-store experience including, for example, the IS V-cart. Although two modules are shown for illustrative purposes, these modules can be, for example, combined, or divided into a plurality of modules/sub-modules.

In some variations, Online Store Module 410 can be configured to obtain one or more data related to a user's online shopping activities. For example, Online Store Module 410 can keep track of the item(s) that the user has looked at, including pricing, promotions, date, and time. Online Store Module 410 can also be configured to implement one or more marketing algorithms based on the user's data, for example, to suggest one or more related or similar items to the user.

In some variations, Local Store Module 420 can be configured to obtain one or more data related to a user's in-store shopping experience. For example, Local Store Module 420 can keep track of the item(s) that the user has looked at, including the store data, pricing, promotions, date, and time, the salesperson who assisted the user in-store, and data such as notes and comments generated by the salesperson. Local Store Module 420 can also be configured to implement one or more market algorithms based on the user's data, for example, to suggest one or more related or similar items to the user. In some variations, the Local Store Module can also be configured to determine commissions for the salesperson for the item(s) that the customer purchased. In some variations, this can include purchases made in store and/or online that can be attributed to the salesperson. In some variations, one or more components of the Local Store Module is implemented in the Point of Sales (POS) system of the local store, and/or on a different server.

Database 453 can be configured to store, for example, shopper information and the related data including OL and IS V-carts. In some variations, the database may be separate from the server but accessible to the server. According to some variations, the system may further include (in addition to the customer's own internet access devices for accessing the merchant's website), a shopper (online) portal, an in-store portal (e.g., via a kiosk, mobile device), an identifying token (email address, phone number).

In some variations, Server 400 can generate targeted e-mails or ads based on shopper data (e.g., items in the V-carts) and send them to the shopper, for example, to facilitate sales of items that the shopper has shown interest in, or to cross-sell other items.

In some variations, by integrating the online sales data with in-store sales data, Server 400 can allow the merchant to determine, for example, how each sale was generated (whether from online or in-store, or the contribution from each source).

In some variations, Server 400 can be configured to interact with other servers and/or systems to provide shopper data for data mining, processing, and/or other uses of the shopper data by those servers/systems.

In some variations, linked carts allow shoppers to start a cart online, visit a store to physically experience a product, then complete their purchase in-store efficiently, without having to recreate their order in the store's POS system. Conversely, a store shopper may start a cart in store, then gain additional information, perhaps by shopping other stores or conferring with a spouse, then complete their order online without having to return to the store or recreate their order online.

References will now be made to FIGS. 5-13, which include exemplary screen shots of a graphical user interface provided by the present subject matter. These screen shots are provided for illustration purposes and do not limit the present subject matter.

Figure 5:
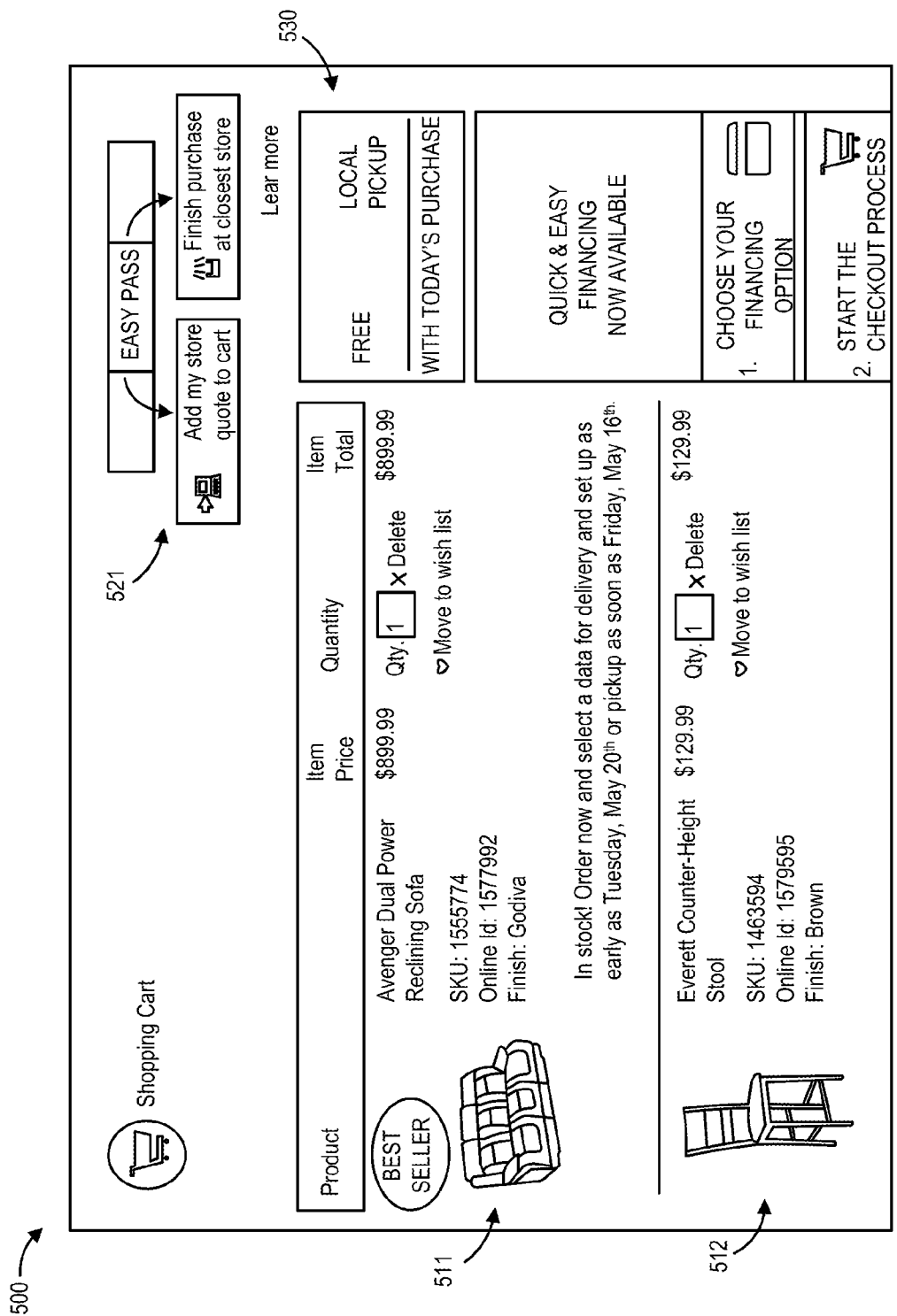
FIGS. 5-13 are exemplary screen shots.

FIG. 5 shows a shopper's online shopping cart 500. Here, the shopper has browsed a number of items, and added items 511 and 512 to the cart. The shopper is provided with options 521 including "Add my store quote to cart" and "Finish purchase at closest store." The cart also includes one or more ads or messages 530.

Figure 6:
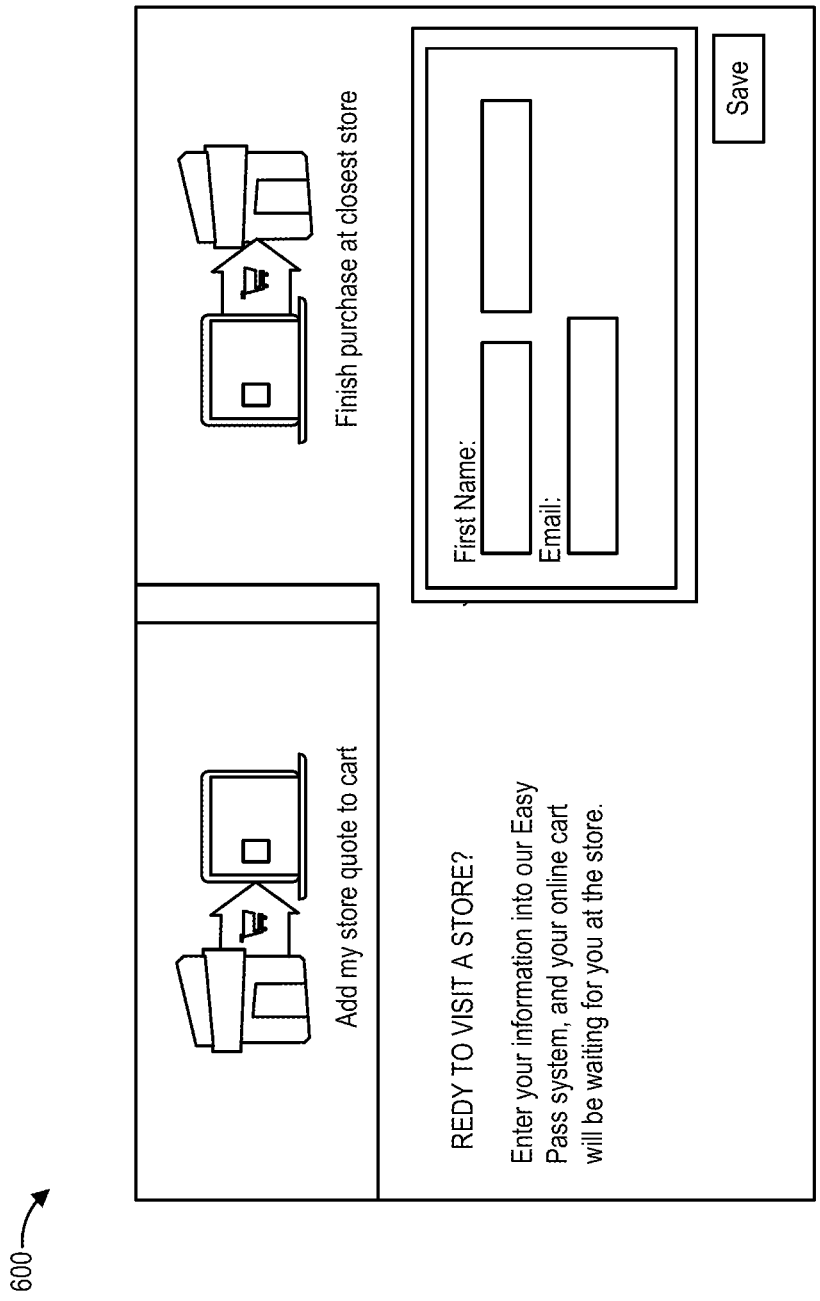
Figure 7:
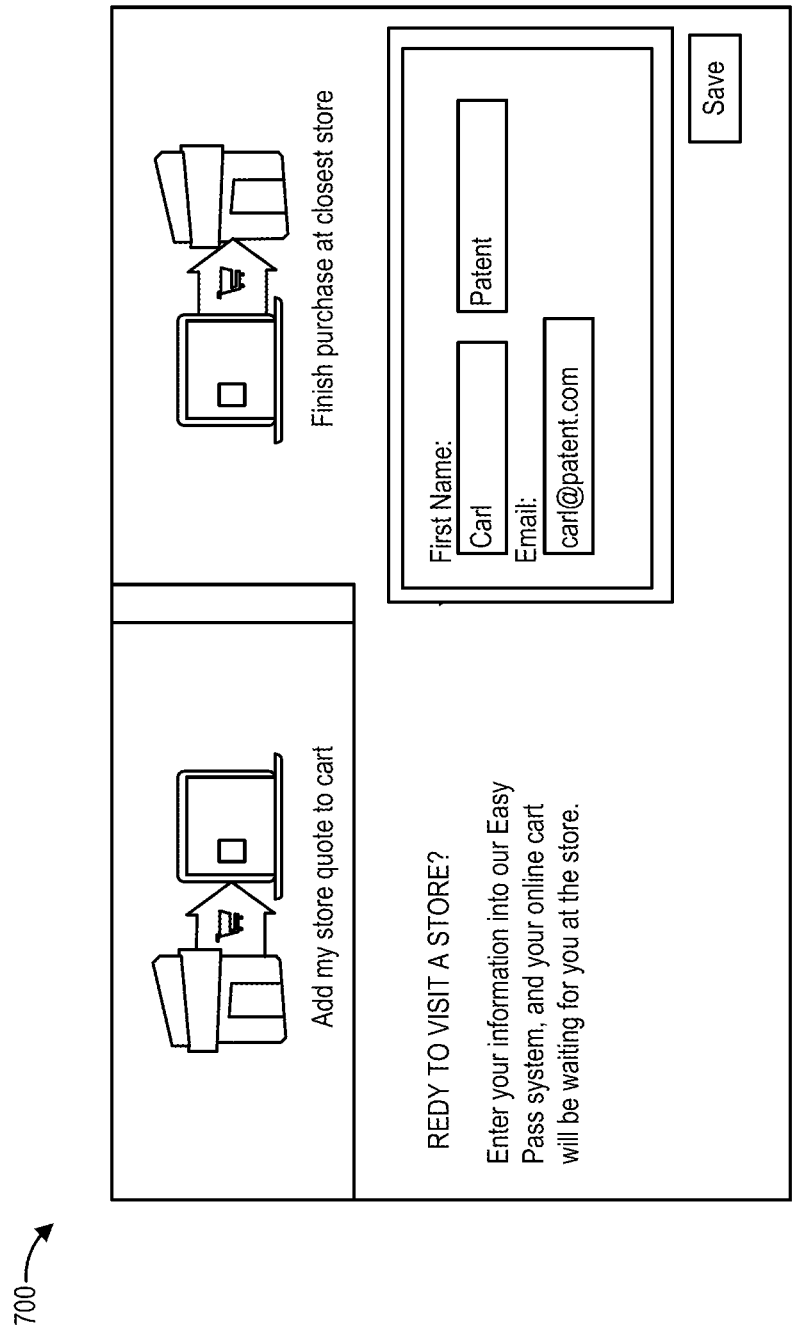
Figure 8:
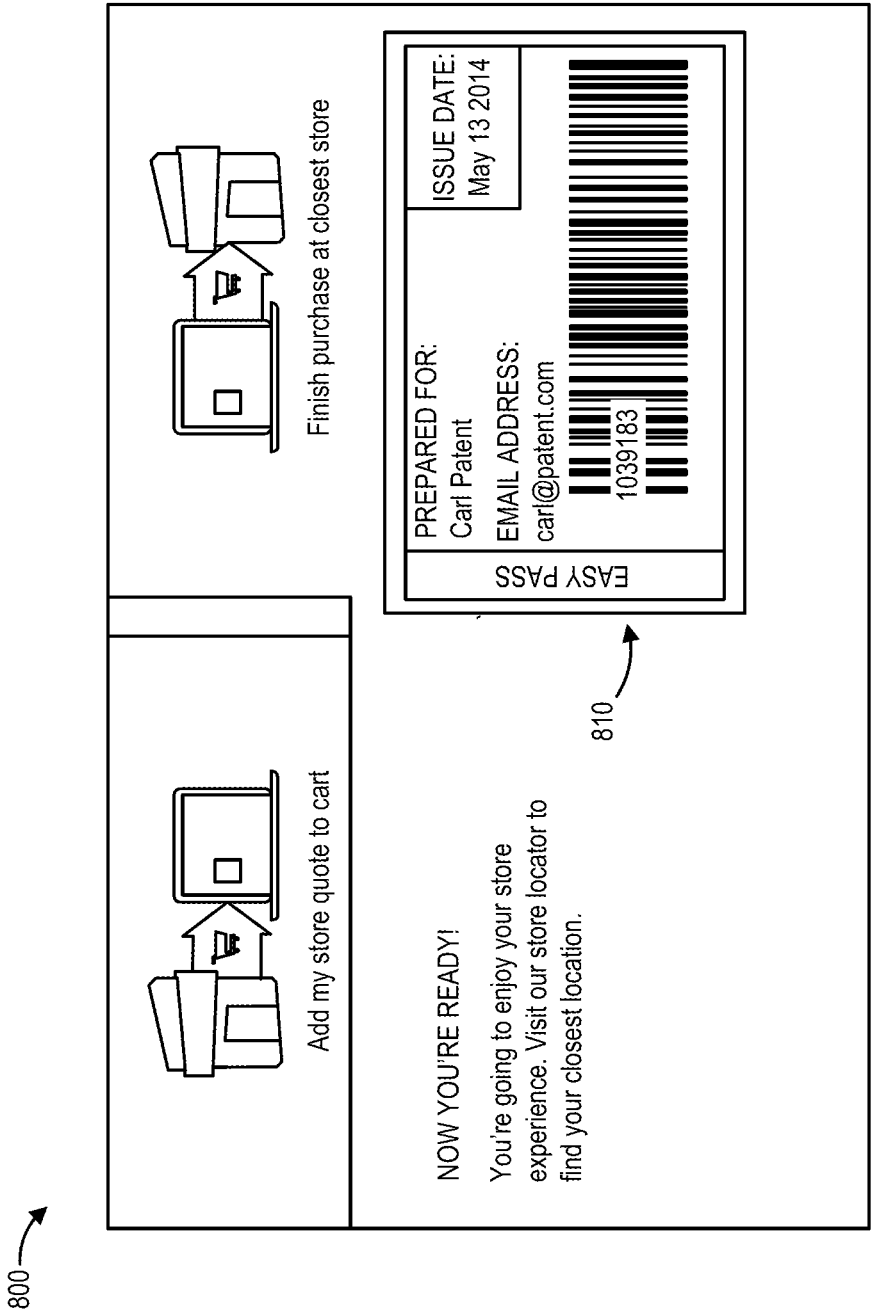
Figure 9:
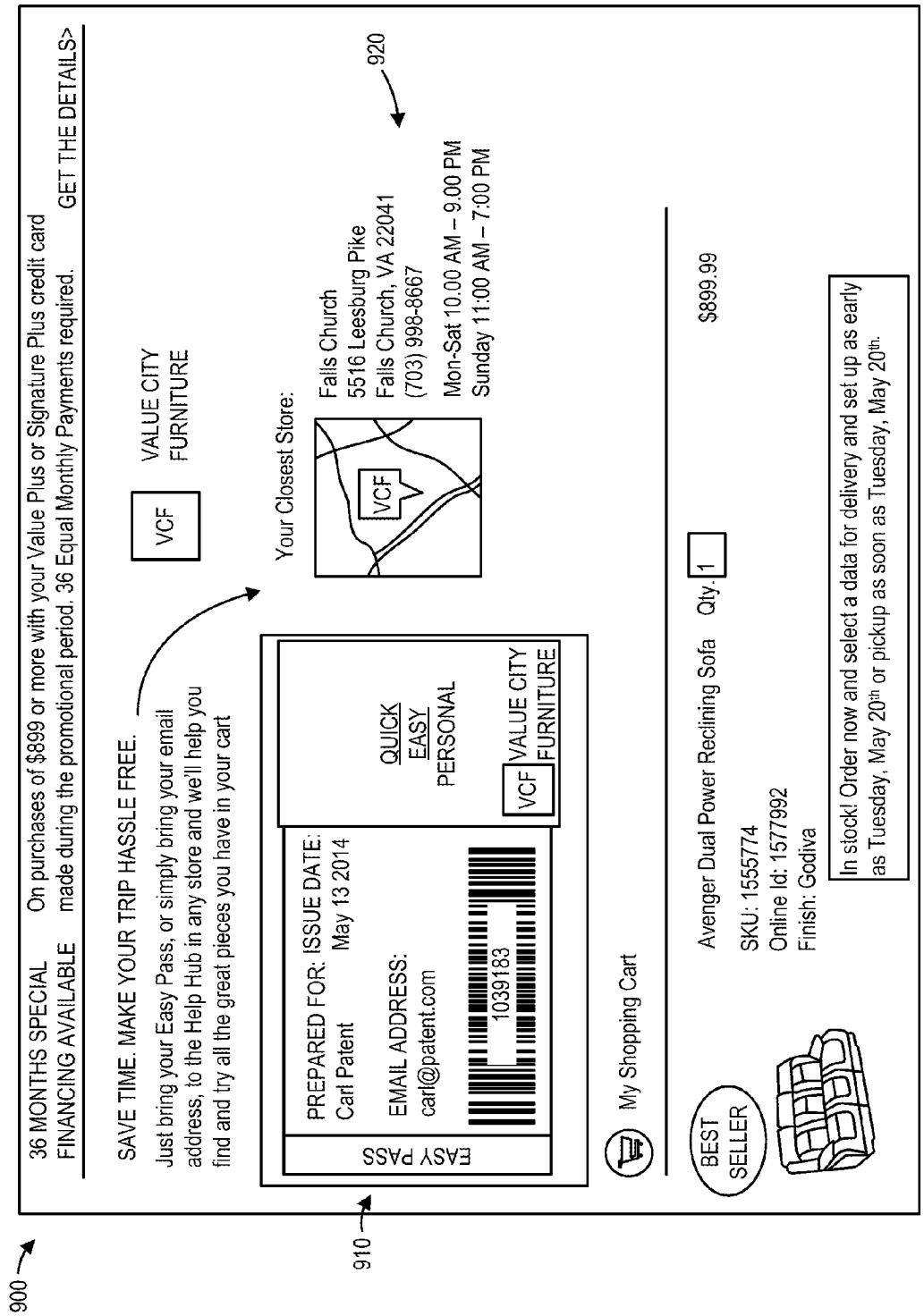

If the shopper clicks "Finish purchase at closest store," the shopper can be taken to FIG. 6 to allow the shopper to input his/her information (if not previously stored). FIG. 7 shows the shopper having provided his/her information and submits the information to the system. The system pushes the shopper's OL V-cart to the store's POS system (IS V-cart), and provides the shopper with a confirmation 810. The confirmation can be displayed, for example, on the shopper's device (e.g., a smartphone). The shopper can use confirmation 810 at the store to access his/her IS V-cart. In some variations, the shopper can access his/her IS V-cart through other means such as a shopper ID, e-mail address, a signal from their mobile device and the like. In some variations, the confirmation can be printed (see FIG. 9). The printed confirmation can include additional information such as, for example, the location and hours of the closest (or selected) store 920, merchant promotional materials 930, and/or the shopper's interested item(s) (e.g., those saved in the cart) 940. Any further changes to the OL V-cart can be updated in the shopper's IS V-cart. Also, any changes made to the IS V-cart when the shopper is in the local stare can be updated in the shopper's OL V-cart. This allows the shopper to go to the store, make adjustments, then choose to purchase at home.

Figure 10:
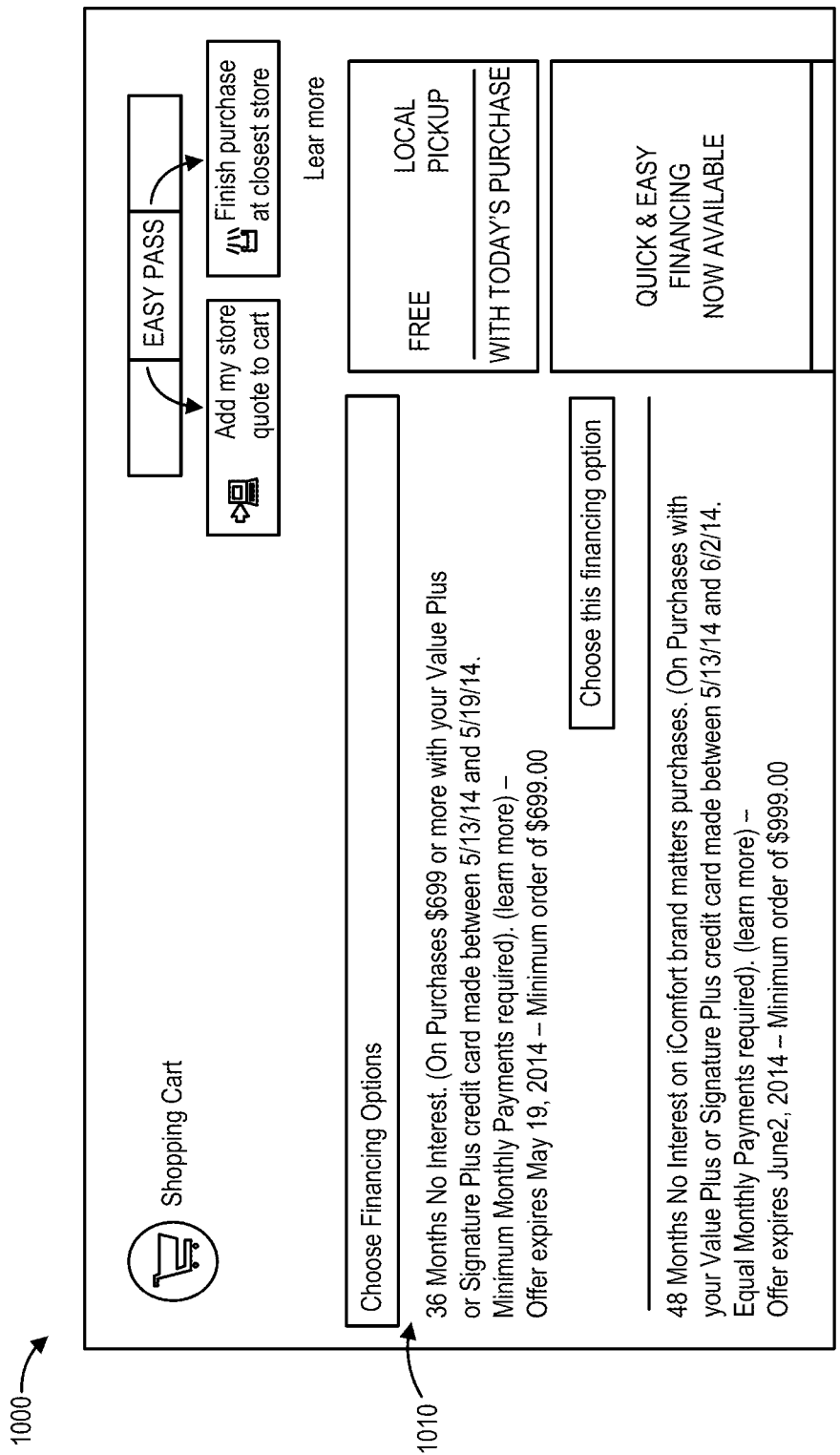

In FIG. 10, the shopper has visited a store but left without purchasing, and now wants to purchase online the items he/she saw in the store. The shopper may have nothing in the OL V-cart but can click "Add my store quote to my cart." As shown in FIG. 10, the shopper can also be provided with one or more financing options 1010. In some variations, the shopper can select a financing option and complete a credit process (e.g., loan pre-approval), which can be stored or associated with the shopper's cart(s) for use online or in-store.

Figure 11:
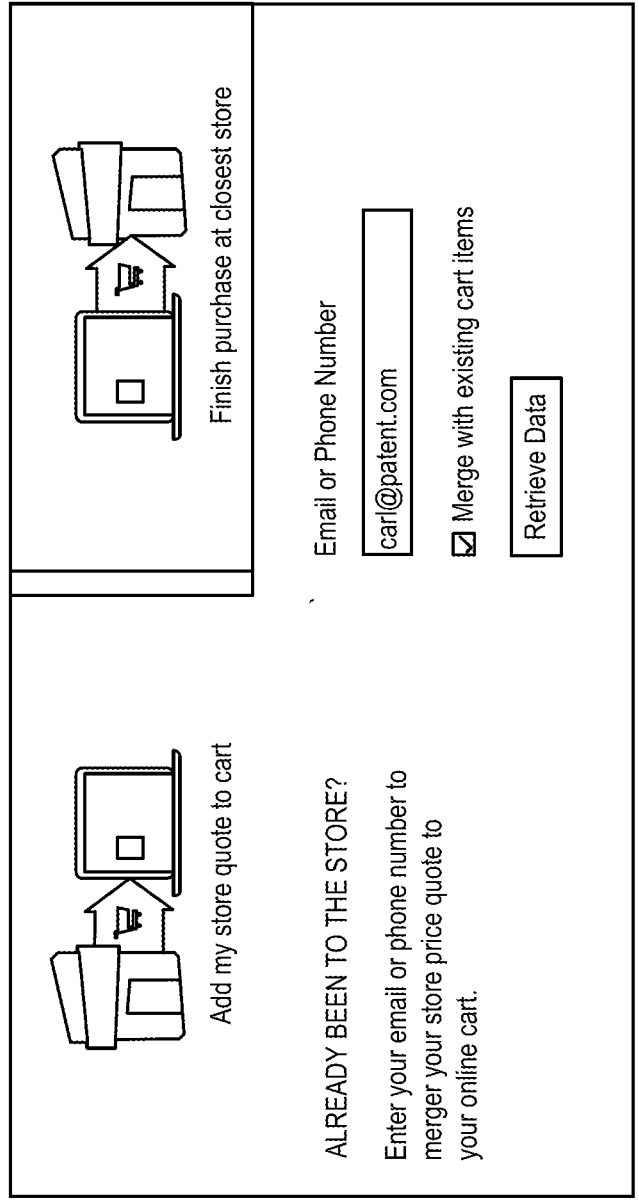

If the shopper selects the "Add my store quote to my cart option," the shopper can be taken to FIG. 11, which allows the shopper to enter, for example, his/her e-mail address, phone or phone number provided in store when creating the IS V-cart.

Figure 12:
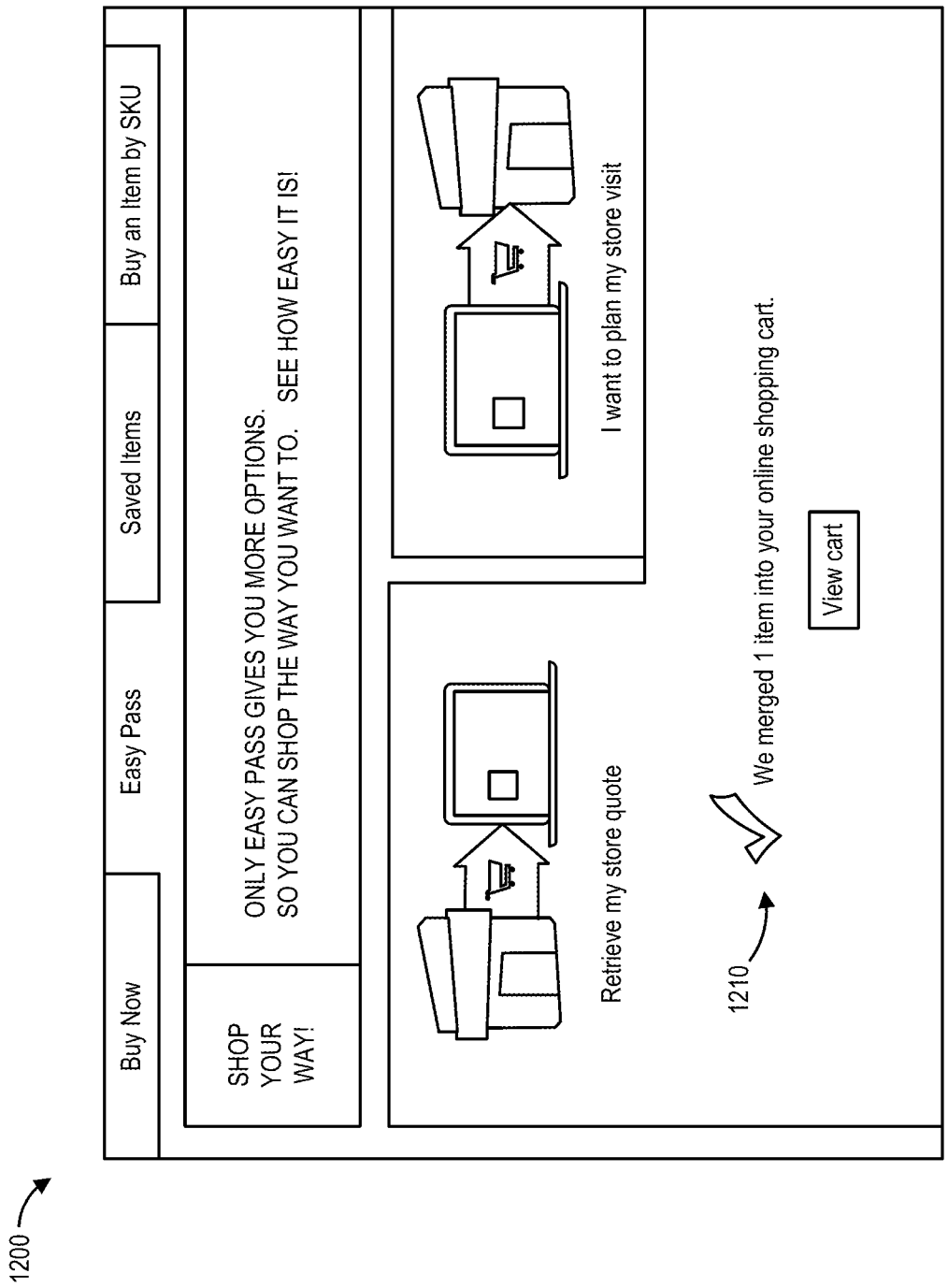

FIG. 12 shows that the item(s) from the IS V-cart has merged into the shopper's OL V-cart. At 1210, a notification is provided confirming that 1 item has been merged (synched) into the online shopping cart.

Figure 13:

FIG. 13 shows that the shopper can purchase their merchandise online. Once completed, the salesperson who assisted the shopper in store can receive a commission. Any further changes to the OL V-cart can also be updated in the shopper's IS V-cart should the shopper, for example, wish to adjust the items and return to the store.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A computer-implemented method for implementation by at least one data processor, the method comprising:
provoking, by at least one data processor, an online website of a merchant for the purchase of goods by one or more shoppers;
storing, by at least one data processor, shopper information in an electronic database for each of the shoppers, wherein each shopper is associated with a respective account;
associating, by at least one data processor, an online electronic shopping cart with each respective account in the electronic database;
associating, by at least one data processor, an online browsing history with each respective account in the electronic database;
updating, by at least one data processor, the online browsing history when an online item has been shown to the respective shopper;
updating, by at least one data processor, the online electronic shopping cart in the electronic database when the respective shopper selects the online item for purchase;
associating, by at least one data processor, an in-store electronic shopping cart with each account in the electronic database, the in-store shopping cart corresponding to at least one retail location of the merchant;
associating, by at least one data processor, an in-store browsing history with each respective account in the electronic database;
updating, by at least one data processor, the in-store browsing history when an in-store item has been shown to the respective shopper;
updating, by at least one data processor, the in-store electronic shopping cart in the electronic database when the respective shopper selects the in-store item for purchase;
linking at least one data processor, the online shopping cart with the in-store shopping cart in the shopper database, including:
synchronizing, by at least one data processor, the online shopping cart and the in-store shopping cart; and
synchronizing, by at least one data processor, the online browsing history and the in-store browsing history.

2. The computer-implemented method according to claim 1, further comprising associating, by at least one data processor, an identification of an in-store sales person with each in-store item shown to the respective shopper by the in-store sales person in the in-store browsing history; and generating, by at least one data processor, an earned commission when sales data representing that the respective shopper purchased the in-store item shown to the respective shopper by the in-store sales person is received.

3. The computer-implemented method according to claim 1, further comprising generating, by at least one data processor, one or more recommended items for each of the shoppers based on the online browsing history.

4. The computer-implemented method according to claim 1, further comprising generating, by at least one data processor, one or more recommended items for each of the shoppers based on the in-store browsing history.

5. The computer-implemented method according to claim 1, further comprising generating, by at least one data processor, one or more recommended items for each of the shoppers based on the synchronized browsing history.

6. The computer-implemented method according to claim 1, further comprising updating, by at least one data processor, the online browsing history when a promotion is displayed to the respective user.

7. The computer-implemented method according to claim 1, further comprising storing, by at least one data processor, financial data for each of the shoppers, the financial data comprising one or more financing options that has been approved for the respective shopper.

8. A system for linking a shopper's online electronic shopping cart with the shopper's in-store electronic shopping cart, the system comprising:
- at least one server, the server having computer instructions operating thereon to perform a method of linking virtual shopping carts, the method comprising:
  - providing, by at least one data processor, an online website of a merchant for the purchase of goods by one or more shoppers;
  - storing, by at least one data processor, shopper information in an electronic database for each of the shoppers, wherein each shopper is associated with a respective account;
  - storing, by at least one data processor, a browsing history in the electronic database for each of the shoppers;
  - associating, by at least one data processor, an online electronic shopping cart with each respective account in the electronic database;
  - associating, by at least one data processor, an online browsing history with each respective account in the electronic database;
  - updating, by at least one data processor, the online browsing history when an online item has been shown to the respective shopper;
  - updating, by at least one data processor, the online electronic shopping cart in the electronic database when the respective shopper selects the online item for purchase;
  - associating, by at least one data processor, an in-store electronic shopping cart with each account in the electronic database, the in-store shopping cart corresponding to at least one retail location of the merchant;
  - associating, by at least one data processor, an in-store browsing history with each respective account in the electronic database;
  - updating, by at least one data processor, the in-store browsing history when an in-store item has been shown to the respective shopper;
  - updating, by at least one data processor, the in-store electronic shopping cart in the electronic database when the respective shopper selects the in-store item for purchase; and
  - linking, by at least one data processor, the online shopping cart with the in-store shopping cart in the shopper database, including:
    - synchronizing, by at least one data processor, the online shopping cart and the in-store shopping cart; and
    - synchronizing, by at least one data processor, the online browsing history and the in-store browsing history.

9. The system according to claim 8, further comprising associating, by at least one data processor, an identification of an in-store sales person with each in-store item shown to the respective shopper by the in-store sales person in the in-store browsing history; and generating, by at least one data processor, an earned commission when sales data representing that the respective shopper purchased the in-store item shown to the respective shopper by the in-store sales person is received.

10. The system according to claim 8, further comprising generating one or more recommended items for each of the shoppers based on the online browsing history.

11. The system according to claim 8, further comprising generating one or more recommended items for each of the shoppers based on the in-store browsing history.

12. The system according to claim 8, further comprising generating one or more recommended items for each of the shoppers based on the synchronized browsing history.

13. The system according to claim 8, further comprising updating the online browsing history when a promotion is displayed to the respective user.

14. The system according to claim 8, further comprising storing financial data for each of the shoppers, the financial data comprising one or more financing options that has been approved for the respective shopper.

15. A non-transitory computer readable media having computer instructions/code provided therein for enabling a method for linking a shopper's on-line electronic shopping cart with the shopper's in-store electronic shopping cart, the method comprising:
- providing, by at least one data processor, an online website of a merchant for the purchase of goods by one or more shoppers;
- storing, by at least one data processor, shopper information in an electronic database for each of the shoppers, wherein each shopper is associated with a respective account;
- associating, by at least one data processor, an online electronic shopping cart with each respective account in the electronic database;
- associating, by at least one data processor, an online browsing history with each respective account in the electronic database;
- updating, by at least one data processor, the online browsing history when an online item has been shown to the respective shopper;
- updating, by at least one data processor, the online electronic shopping cart in the electronic database when the respective shopper selects the online item for purchase;
- associating, by at least one data processor, an in-store electronic shopping cart with each account in the electronic database, the in-store shopping cart corresponding to at least one retail location of the merchant;
- associating, by at least one data processor, an in-store browsing history with each respective account in the electronic database;
- updating, by at least one data processor, the in-store browsing history when an in-store item has been shown to the respective shopper;
- updating, by at least one data processor, the in-store electronic shopping cart in the electronic database when the respective shopper selects the in-store item for purchase; and
- linking, by at least one data processor, the online shopping cart with the in-store shopping cart in the shopper database, including:
  - synchronizing, by at least one data processor, the online shopping cart and the in-store shopping cart; and
  - synchronizing, by at least one data processor, the online browsing history and the in-store browsing history.

16. The non-transitory computer readable media according to claim 15, further comprising associatingjy at least one data processor, an identification of an in-store sales person with each in-store item shown to the respective shopper by the in-store sales person in the in-store browsing history; and generating, by at least one data processor, an earned commission when sales data representing that the respective shopper purchased the in-store item shown to the respective shopper by the in-store sales person is received.

17. The non-transitory computer readable media according to claim 15, further comprising generating one or more recommended items for each of the shoppers based on the online browsing history.

18. The non-transitory computer readable media according to claim 15, further comprising generating one or more recommended items for each of the shoppers based on the in-store browsing history.

19. The non-transitory computer readable media according to claim 15, further comprising generating one or more recommended items for each of the shoppers based on the synchronized browsing history.

20. The non-transitory computer readable media according to claim 15, further comprising updating the online browsing history when a promotion is displayed to the respective user.

21. The non-transitory computer readable media according to claim 15, further comprising storing financial data for each of the shoppers, the financial data comprising one or more financing options that has been approved for the respective shopper.

* * * * *